March 10, 1970 H. HEILMANN ET AL 3,500,092
AIRGAP FOR SMALL ASYNCHRONOUS MOTORS
Filed June 30, 1967 4 Sheets-Sheet 3

INVENTORS
Heinz Heilmann
Joseph Ludemann &
Siegfried Tillner
BY Spencer & Kaye
ATTORNEYS

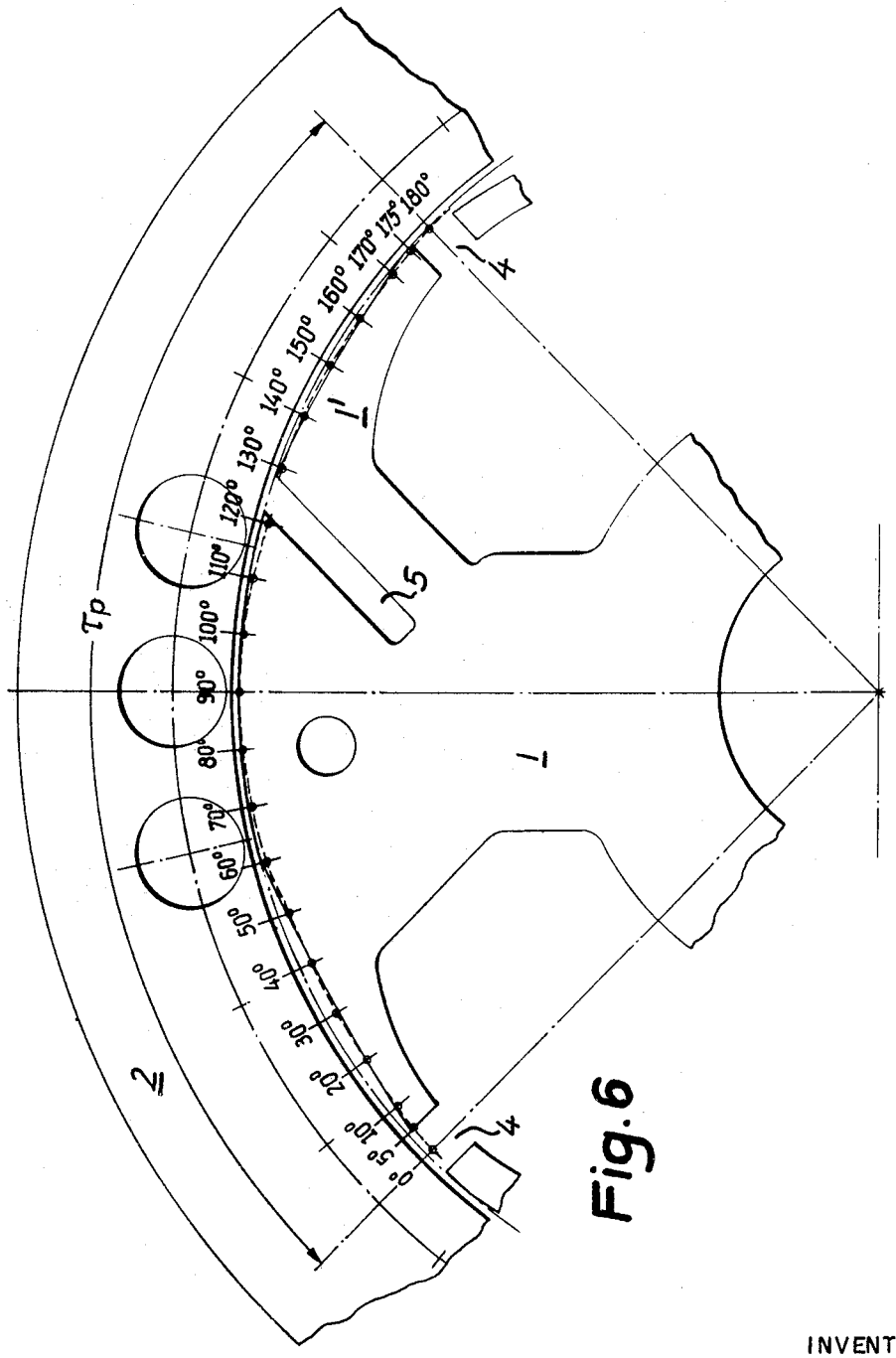

United States Patent Office 3,500,092
Patented Mar. 10, 1970

3,500,092
AIRGAP FOR SMALL ASYNCHRONOUS MOTORS
Heinz Heilmann, Joseph Ludemann, and Siegfried Tillner, Oldenburg, Germany, assignors to Licentia Patent-Verwaltungs G.m.b.H., Frankfurt am Main, Germany
Filed June 30, 1967, Ser. No. 650,298
Claims priority, application Germany, July 1, 1966, L 53,956
Int. Cl. H02k *17/02*
U.S. Cl. 310—172         6 Claims

ABSTRACT OF THE DISCLOSURE

Improving the electrical characteristics, and particularly the excitation field waveform, in asynchronous salient pole motors by analytically determining the airgap configuration required to correct for harmonic components of the field so as to create an excitation field whose flux density varies across each pole in the same manner as the flux density resulting from the fundamental component of the excitation field, and giving the motor airgap such a configuration.

BACKGROUND OF THE INVENTION

The present invention relates to asynchronous motors with a more suitable airgap and to motors produced according to this method.

The present invention is concerned with a method for determining and adjusting the size of the airgap between the rotor and the stator of small asynchronous motors having concentric windings and a predetermined minimum airgap width so as to conform the characteristics of asynchronous motors having salient poles and concentric windings to those of asynchronous motors having distributed windings. The invention also concerns a motor produced according to this method.

The flux field curves of motors having a small number of stator grooves, and particularly those with salient poles and concentric windings, exhibit a high proportion of field harmonics which result in a general decrease in the efficiency of such motors. Salient pole motors, in order to operate at all, must be provided with magnetic bridges between the poles from pole tip to pole tip. These magnetic bridges, or stray paths, influence the stray flux as well as the useful flux entering the rotor. Modifications alone of their configuration, insofar as it is practically possible, will not eliminate to the desired extent the losses and torque dips resulting from the field harmonics present in the acceleration curves.

It has already been proposed, for A.C. motors with salient poles, to decrease the length of the airgap between the rotor and the stator by giving the stray paths therebelow a fraction of the length of the air gap below the poles in order to arrive at a better and more effective electrical utilization of these motors (see German Patent 1,040,122). Moreover, it is known to increase the size of the airgap below the auxiliary poles on A.C. motors having an auxiliary capacitor phase and salient poles, especially in order to decrease the leakage of harmonics in the airgap (see German Patent 1,178,503).

In shaded-pole motors having stray paths provided between the pole tips, the airgap below the main pole portion can be continuously increased in the direction toward the pole tip, or recesses can be provided in the region of the shoulder of the main pole tip and in the main pole tip itself in order to allow for a certain amount of control and to increase the efficiency (see French Patent 1,064,568).

A continuous enlargement of the airgap below the main pole tip in shaded-pole motors having mechanically interrupted magnetic bridges, so-called motors without stray flux laminations, has been proposed several times with varying explanations of their effects (e.g., German Patents 212,073 and 597,982, French Patent 1,152,925, and U.S. Patent 2,591,117).

Similar proposals including recesses in the area of the main pole tip and considering an offset rotor were made for a shaded-pole motor with salient poles and mechanically interrupted magnetic bridges in order to achieve a better starting torque and good operational efficiency or to attain a balance between the former and the latter, for example (U.S. Patent 2,827,583). In such a shaded-pole motor, the dip in the acceleration curve is reduced by a magnetic constriction in the form of a slit in the shoulder of the main pole tip (see U.S. Patent 2,815,460).

The measures already proposed for correcting the size of the airgap by effecting an estimated continuous or progressive enlargement of the airgap between the pole tips or toward the main pole tip, for example, do not result in the best possible utilization of the stator lamination cross section in shaded-pole motors. The same is true of the provision of stamped perforations in the poles extending toward the main pole tip or in the pole tip itself in order to create magnetic saturation zones, and of a decreased pole tip width serving as a constriction. They all result only in production and technical difficulties.

Measures to increase the distribution of harmonics in the rotor by a reduction in the number of grooves or by closed rotor grooves or by extremely offset rotor grooves result only in a decrease in effieciency for the fundamental field.

All previously proposed measures to increase the airgap field in asynchronous motors with salient poles are of an empirical nature, gained by assumptions from experience.

SUMMARY OF THE INVENTION

It is therefore a primary object of the present invention to overcome the above-noted drawbacks.

Another object of the present invention is to provide small salient pole asynchronous motors with an improved airgap configuration.

Another object of the present invention is to provide an improved method for determining the required airgap configuration for such motors.

A still further object of the present invention is to provide motors constructed according to this method.

A still further object of the present invention is to depart from the merely empirical procedures and to provide a method for the analytical determination of airgap dimensions for asynchronous motors with salient poles.

These and other objects are achieved, according to the present invention, by a method for producing an asynchronous salient pole motor having an airgap exhibiting improved excitation field harmonic suppression characteristics, which method includes shaping each pole face of the motor to give the motor airgap a configuration across each pole pitch which conforms according substantially to the equation:

$$\delta_x = \delta_m + \delta_m \left[ \frac{\hat{B}_3}{\hat{B}_1} \sin(3x + \varphi_3) + \frac{\hat{B}_5}{\hat{B}_1} \sin(5x + \varphi_5) \cdots \right.$$
$$\left. + \frac{\hat{B}_n}{\hat{B}_1} \sin(nx + \varphi_n) \right] \quad (1)$$

where:

$\delta_x$ = the desired airgap size at any point $x$ measured across the pole pitch,
$\delta_m$ = the median airgap size, $\hat{B}_1$=the peak value of the fundamental of the flux field,
$\hat{B}_3$=the peak value of the third harmonic of the flux field,
$\hat{B}_5$=the peak value of the fifth harmonic,
$\hat{B}_n$=the peak value of the $n$th harmonic,
$\varphi_3$, $\varphi_5$, $\varphi_n$=the phase angles of the corresponding harmonics,
$x$=the electric angle of each point across the pole pitch.

The equation is based on the concept that for a given flux the length of the airgap should be inversely proportional to the inductance.

BRIEF DESCRIPTION OF THE DRAWINGS

FIGURE 6 is a partial, axial view of a motor constructed according to the principles of the present invention.

DESCRIPTION OF THE PREFERRED EMBODIMENTS

Experience has shown that it is sufficient for the practical considerations of the stator lamination cross section of motors with salient poles to consider only the third field harmonic and to assume its spatial phase angle with respect to the fundamental to be zero. The above-mentioned Equation 1 is then simplified to:

$$\delta_x = \delta_m + \delta_m \left[ \frac{\hat{B}_3}{\hat{B}_1} \sin 3x \right] \quad (2)$$

Figure 1:
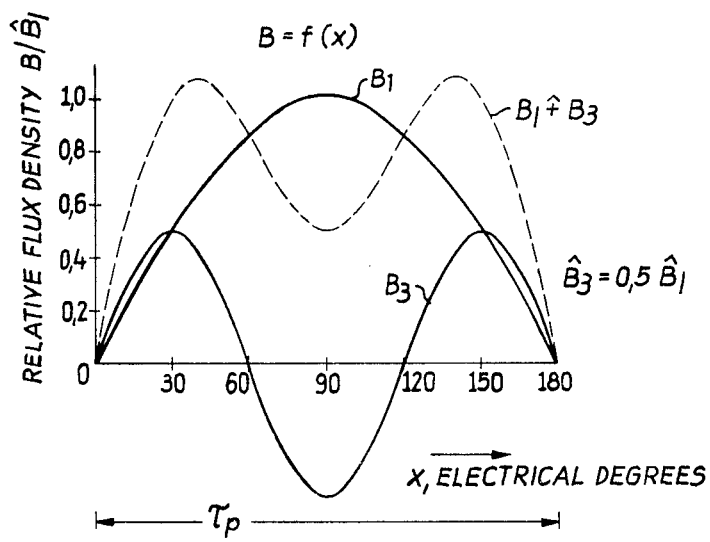
FIGURE 1 is a chart containing graphs used in explaining the method according to the present invention.

FIGURE 1 shows a curve $B_1 + B_3$ of the total flux density, or induction, which results from the fundamental $B_1$ having a peak value of $\hat{B}_1$ and a positive third harmonic flux $B_3$ having a peak value of $\hat{B}_3$ and in phase with the fundamental, $\hat{B}_3$ being assumed to be equal to $0.5\hat{B}_1$. The third harmonic could be generated from the phase of a capacitor motor. To bring the field curve $B_1 + B_3$ back to sinusoidal form, the inductance of the magnetic flux path would have to be decreased along the pole pitch at the locations of the electrical angles of 30° and 150° and would have to be increased at 90°.

Figure 2:
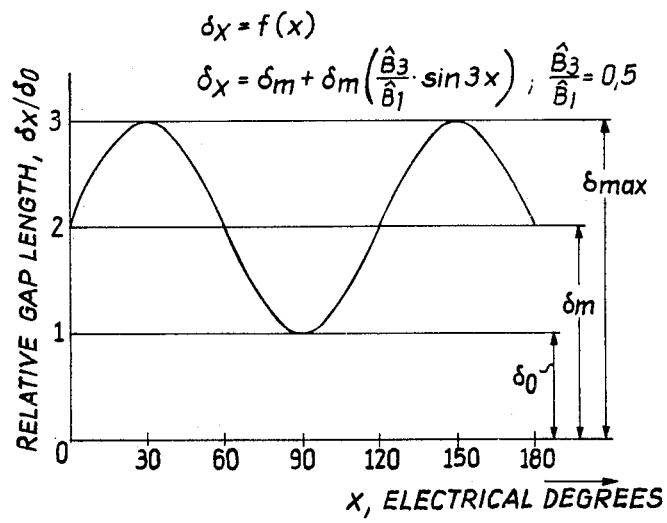
FIGURE 2 is a chart containing another graph used for explaining the method of the present invention.

According to the present invention, this is accomplished by enlarging the airgap at the 30° and at the 150° locations to the extent of the deviation of curve $B_1 + B_3$ from a sinusoidal curve and by narrowing it at 90°. A minimum airgap must be maintained, however, for structural reasons. In principle, an airgap is created whose length varies over the pole pitch in the manner shown in FIGURE 2, in which $\delta_0$ is the minimum, $\delta_m$ the median and $\delta_{max}$ the maximum airgap length.

The obtaining of an airgap according to the method of the present invention, strictly speaking, requires the measurement of the magnetic flux path inductance across the pole pitch. The analyzed values for the fundamental and for the field harmonics are then to be inserted into the above-mentioned equations. If, therefore, the field curve of a motor with a uniform airgap is known and analyzed, a single mathematical computation for determining the required airgap size and configuration is sufficient for arriving at the most favorable utilization of the motor.

In practice, a field waveform analysis will generally not be employed because of the complicated procedures which it entails. As mentioned above, the method according to the present invention makes possible the required qualitative variation in the size of the airgap according to its correct position and in the correct manner with an assumed harmonic-to-fundamental flux amplitude ratio. The quantitative proportion of the maximum airgap length is unknown and must be extrapolated from the given median airgap from various assumed ratios of the peak values of the third field harmonic to the fundamental. This procedure will lead to the most favorably configured airgap after but a few experimental steps.

When the method of the present invention is applied to shaded-pole motors, the separation of the poles of the main pole portion and the shaded pole portion must be considered. The damping occurring under the shaded pole because of the short-circuit winding must be considered with an appropriate factor during the construction of the airgap. This damping factor $\alpha$ represents the ratio of the airgap length at one point on the shaded pole to that of the airgap at the corresponding point on the main pole. For the determination of the airgap configuration under the shaded pole, the equation:

$$\delta_x = \alpha \left[ \delta_m + \delta_m \left( \frac{\hat{B}_3}{\hat{B}_1} \right) \sin (3x + \varphi_3) \right] \quad (3)$$

results if only the third field harmonic is considered. This damping factor $\alpha$ has been empirically determined to be about 0.58 through experiments with a particular four-pole shaded-pole motor. Deviation from this value clearly deteriorates the operational behavior of the motor.

The method according to the present invention for determining the size of the airgap will be further explained in connection with an embodiment in the form of a four-pole external rotor shaded pole motor.

Figure 3:
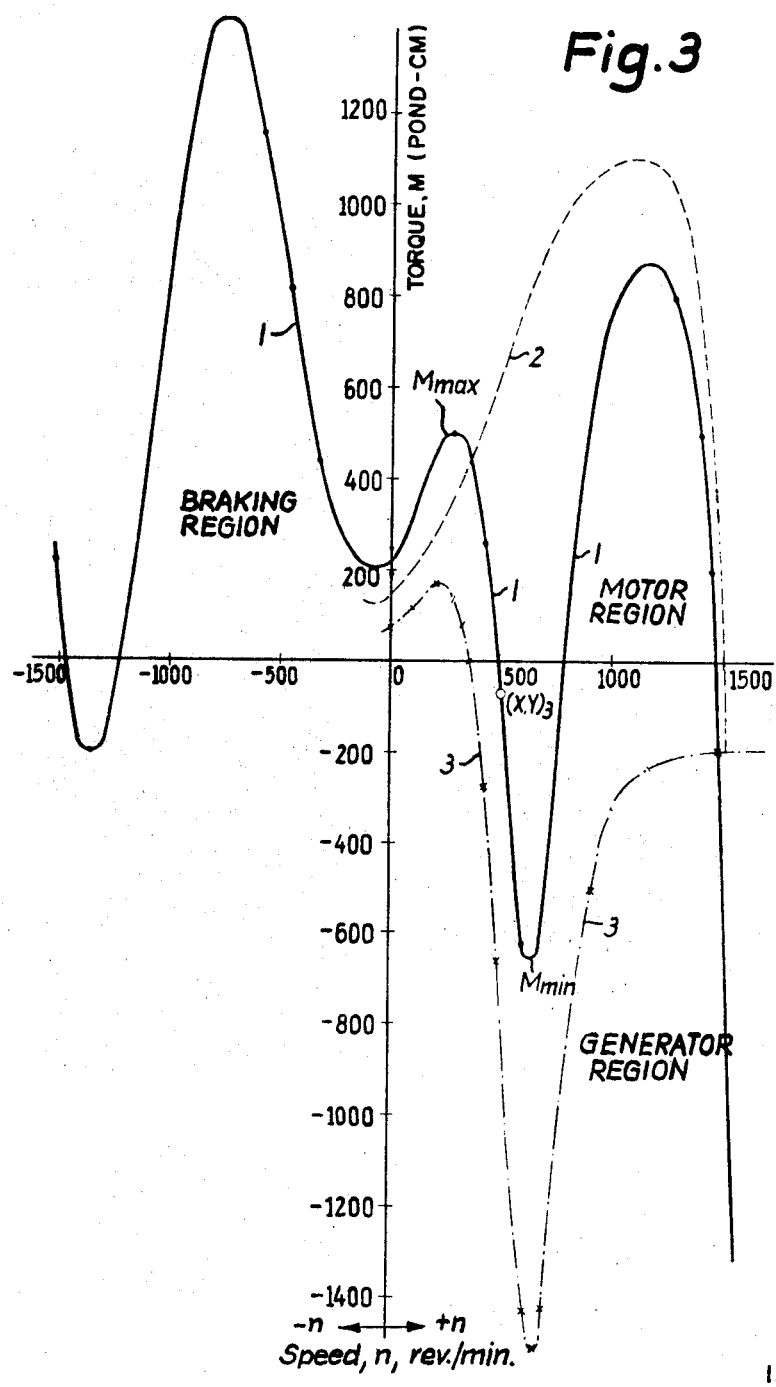
FIGURE 3 is a chart containing further curves illustrating the behavior of motors of the type with which the present invention is concerned.

FIGURE 3 shows a curve 1 representing the torque-speed characteristic occurring in a motor having a uniform airgap length. The dip in torque extending into the negative torque region is almost as large as the breakdown torque. Such a strong dip is caused substantially by the third field harmonic because at a certain field harmonic the torque-speed characteristic will run approximately through the intersection of the coordinates indicated by this field harmonic and by the maxima and minima of the characteristic. This intersection is designated as $(x, y)_3$ and is found at $x=1500/3=500$ revolutions per minute. This determination always applies when there is a very distinct field harmonic, as is the case with the third field harmonic of shaded pole motors.

The third harmonic is positive, therefore the starting moment produced by the fundamental component of the field must lie below that of the torque-speed characteristic. If it is further assumed that the decrease in rotating speed at the idling point is exclusively determined by the braking field harmonic, and the end of the fundamental characteristic must occur practically at the synchronous speed. Thus, the torque-speed characteristic resulting solely from the fundamental field component can be drawn in as an estimation and is shown in the FIGURE 3 by the broken-line curve 2. Subtraction of curve 2 from curve 1 results in the characteristic 3 resulting substantially completely from the third harmonic field component. The extraordinarily strong influence of the third field harmonic is clear. For this harmonic, the ratio of the peak values of the third field harmonic to the fundamental is to be applied as an empirical value of approximately 0.6.

Figure 4:
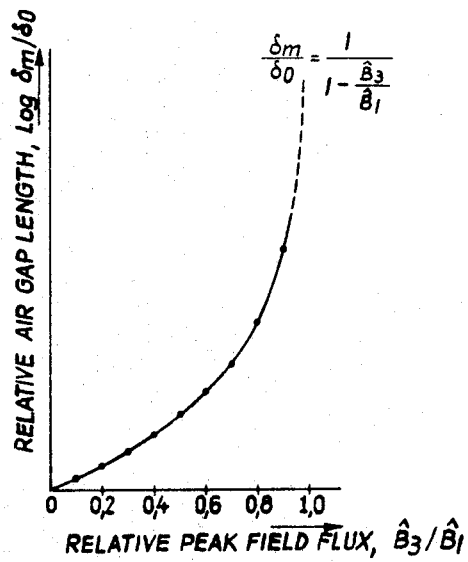
FIGURE 4 is a chart illustrating the results obtained according to the present invention.

From Equation 2, with $\delta_x = \delta_0$ and $x=90°$, which is valid for a positive in-phase third harmonic field component, the equation:

$$\frac{\delta_m}{\delta_0} = \frac{1}{1 - \frac{\hat{B}_3}{\hat{B}_1}} \quad (4)$$

results. From Equation 4 the value $\delta_m$ required for the solution of Equations 1 or 2 can be determined with a given $\delta_0$ and an assumed $B_3/B_1$, the curve resulting from this equation being shown in FIGURE 4 in terms of $\delta_m/\delta_0$ as a function of $B_3/B_1$.

Figure 5:
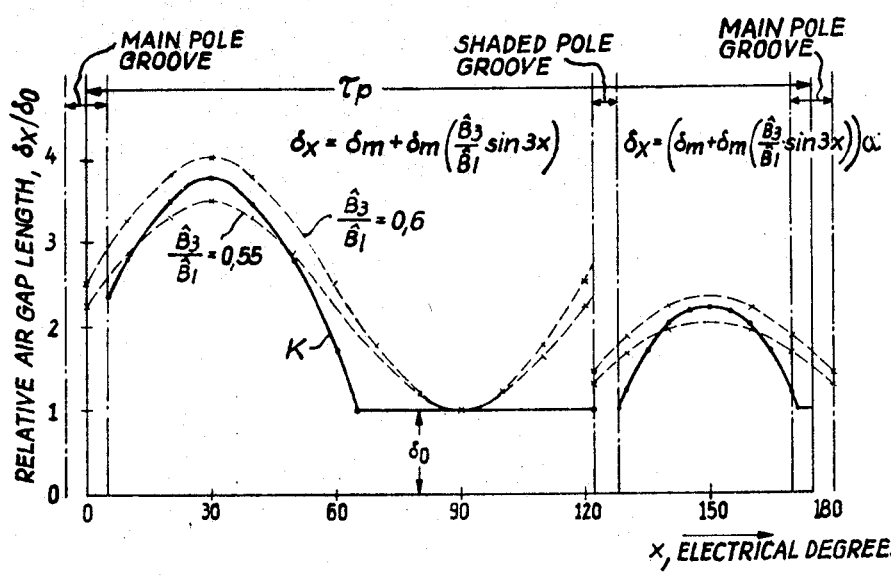
FIGURE 5 is a chart containing curves illustrating the results obtained according to the present invention.

With this calculated value for $\delta_m$ and the associated value for $B_3/B_1$ of 0.6, the entire gap $\delta_x$ can now be calculated. The configuration for this airgap is represented in FIGURE 5 in terms of the ratio $\delta_x:\delta_0$ as a function of the pitch angle $x$ across the pole pitch $\gamma_p$, wherein the damping factor $\alpha = 0.58$ is employed for the shaded pole portion. The calculation is repeated for determining the optimum configuration with the ratio $B_3/B_1 = 0.55$ and the result is also shown on FIGURE 5.

FIGURE 5 shows two broken-line curves representing the calculated airgap configuration across both the main pole and the shaded pole for two values of $B_3/B_1$, these values being 0.6 and 0.55.

With reference to the constructive embodiment of the pole lamination cross section, the actual airgap is given the form shown by the solid line K, in order to simplify construction, which does not result in any noticeable decrease in efficiency as compared to the best theoretical configuration of the stator.

FIGURE 6 is a partial axial view, to scale, of a four-pole motor having its stator formed according to the present invention to produce an airgap whose length varies according to the curve K of FIGURE 5. The motor includes an internal stator each pole 1 of which has a shaded pole portion 1' separated from the main pole portion by a groove, or slit, 5. Each pole is separated from its adjoining poles by grooves, or slits, 4. The motor has an external rotor 4 whose inner surface is cylindrical. The calculated optimum configuration of the stator pole surface is shown in broken lines for purposes of comparison.

The characteristic features of the motor of FIGURE 6 are that the air gap narrows at the pole tips and that in shaded-pole motors a change in the airgap length also results under the shaded pole.

It will be understood that the above description of the present invention is susceptible to various modifications, changes, and adaptations.

We claim:
1. In an asynchronous salient pole motor having a stator and a rotor, the improvement wherein each salient pole thereof is shaped to give the airgap adjacent the pole a configuration across each pole face which conforms substantially with the equation:

$$\delta_x = \delta_m + \delta_m \left[ \frac{\hat{B}_3}{\hat{B}_1} \sin(3x + \varphi_3) + \frac{\hat{B}_5}{\hat{B}_1} \sin(5x + \varphi_5) \ldots + \frac{\hat{B}_n}{\hat{B}_1} \sin(nx + \varphi_n) \right]$$

where:

$\delta_x$ = the desired airgap length at each angular position across the pole pitch;

$\delta_m$ = a preselected median airgap length;

$\hat{B}_1$ = the peak value of the fundamental component of the excitation flux field of a similar motor having a uniform airgap length;

$\hat{B}_3$ = the peak value of the third harmonic component of the flux field of such similar motor;

$\hat{B}_5$ = the peak value of the fifth harmonic component of the flux field of such similar motor;

$\hat{B}_n$ = peak value of the $n$th harmonic component of the flux field of such similar motor;

$\varphi_3$, $\varphi_5$ and $\varphi_n$ = the phase angles of the third, fifth and $n$th harmonic components, respectively, relative to the fundamental component of the flux field; and $x$ = the angular position of each point across the pole pitch, in electrical degrees, whereby the airgap length decreases toward each extremity of said motor pole.

2. In a motor as defined in claim 1 and wherein each said pole has a shaded pole portion, the improvement wherein each shaded pole portion is shaped to have an associated airgap whose length varies in accordance with said equation multiplied by a selected damping factor which is less than unity.

3. An arrangement as defined in claim 1 wherein each said pole subtends a pitch angle of 180 electrical degrees and is shaped to have a maximum airgap length at pole pitch angles of 30° and 150° and a minimum airgap length at a pole pitch angle of 90°.

4. An arrangement as defined in claim 2 wherein each said pole subtends a pitch angle of 180 electrical degrees, the shaded pole portion of each said pole extends substantially between the pitch angles of 120 and 180 electrical degrees, said shaded pole portion has a maximum airgap length at the point thereof corresponding to 150 electrical degrees, and the main pole portion of each said pole has a maximum airgap length at a position corresponding to 30 electrical degrees and a minimum airgap length at a position corresponding to 90 electrical degrees.

5. An arrangement as defined in claim 1 wherein the surface of each said pole is defined by a plurality of basic geometric shapes which approximate the shape determined by said equation.

6. An arrangement as defined in claim 1 wherein the median airgap length $\delta_m$ is selected according to the equation:

$$\delta_m = \frac{\delta_0}{1 - \frac{\hat{B}_3}{\hat{B}_1}}$$

where $\delta_0$ is the minimum airgap length.

References Cited

UNITED STATES PATENTS 2,773,999  12/1956  Morrill _____ 310—172

J D MILLER, Primary Examiner

L. A. ROUSE, Assistant Examiner

U.S. Cl. X.R.

310—51